(12) United States Patent
Huang

(10) Patent No.: US 11,112,320 B2
(45) Date of Patent: Sep. 7, 2021

(54) TORSION SENSOR MAGNETIC RING STRUCTURE

(71) Applicant: Yuan-Hsiang Huang, Taichung (TW)

(72) Inventor: Yuan-Hsiang Huang, Taichung (TW)

( * ) Notice: Subject to any disclaimer, the term of this patent is extended or adjusted under 35 U.S.C. 154(b) by 194 days.

(21) Appl. No.: 16/413,597

(22) Filed: May 15, 2019

(65) Prior Publication Data
US 2020/0363276 A1   Nov. 19, 2020

(51) Int. Cl.
*G01L 3/10* (2006.01)
(52) U.S. Cl.
CPC .................... *G01L 3/104* (2013.01)
(58) Field of Classification Search
CPC .............................. H02K 1/148; G01L 3/104
USPC ..................................... 73/862.325
See application file for complete search history.

(56) References Cited

U.S. PATENT DOCUMENTS

| 7,816,830 B2 * | 10/2010 | Dickes | H02K 1/185 |
| | | | 310/156.12 |
| 2013/0154397 A1 * | 6/2013 | Sullivan | H02K 1/141 |
| | | | 310/12.18 |

FOREIGN PATENT DOCUMENTS

JP   2006187176   *   7/2006

* cited by examiner

*Primary Examiner* — Octavia Hollington
(74) *Attorney, Agent, or Firm* — Leong C. Lei

(57) ABSTRACT

A torsion sensor magnetic ring structure includes a seat and magnetic ring, wherein the magnetic ring is formed by punching a metal plate; a long side of a substrate is formed with a plurality of integral spaced magnetic teeth, one narrow end of the substrate is formed into an engagement tenon, and another narrow end thereof an engagement mortise, the substrate is wound and the tenon is in engagement with the engagement mortise to form into the circular magnetic ring. Therefore, the present invention is simpler than conventional magnetic rings in structure, and capable of accurately lowering the material cost and effectively reducing the volume and space.

2 Claims, 4 Drawing Sheets

TORSION SENSOR MAGNETIC RING STRUCTURE

(a) TECHNICAL FIELD OF THE INVENTION

The present invention relates to a torsion sensor magnetic ring structure, including a seat and magnetic ring made by punching a metal plate; the long side of a substrate is formed with a plurality of integral spaced magnetic teeth, one narrow end of the substrate is formed into an engagement tenon, and another end thereof an engagement mortise; the substrate is then wound and the engagement tenon is in engagement with the engagement mortise to form the circular magnetic ring.

(b) DESCRIPTION OF THE PRIOR ART

The current torsion sensor magnetic ring structure is shown in FIG. 1; a magnetic ring 10 is constituted by punching the inside of a wide ring 11 to form a plurality of spaced convex vertical magnetic portions 12. Because the wide ring 11 is large in area, relatively high production and sales costs are caused.

SUMMARY OF THE INVENTION

To overcome the above defects, the present invention is proposed.

One object of the present invention is to provide a torsion sensor magnetic ring structure, capable of reducing the area of the magnetic ring.

To achieve the object mentioned above, the present invention proposes a torsion sensor magnetic ring structure, including a seat and magnetic ring, wherein the magnetic ring is formed by punching a metal plate; a long side of a substrate is formed with a plurality of integral spaced magnetic teeth, one narrow end of the substrate is formed into an engagement tenon, and another narrow end thereof an engagement mortise, the substrate is wound and the tenon is in engagement with the engagement mortise to form into the circular magnetic ring. Therefore, the present invention is simpler than conventional magnetic rings in structure, and capable of accurately lowering the material cost and effectively reducing the volume and space.

DETAILED DESCRIPTION OF THE PREFERRED EMBODIMENTS

Figure 1:
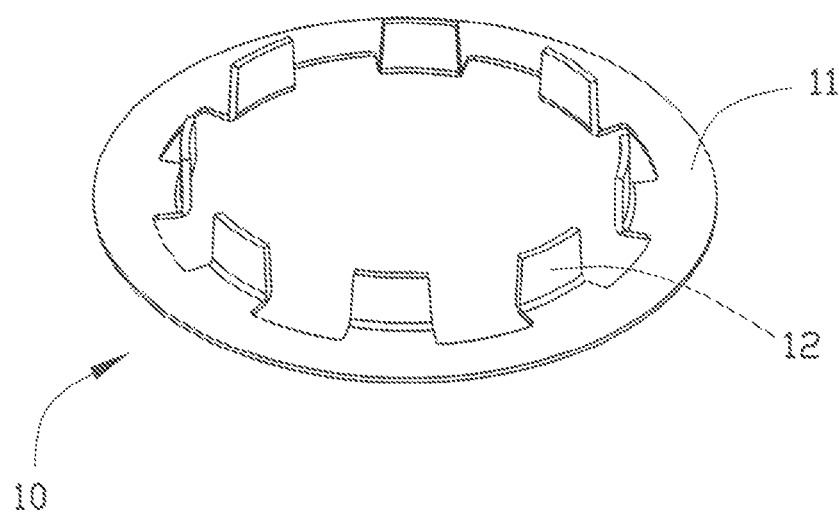
FIG. 1 is a perspective of a conventional magnetic ring.
Figure 2:
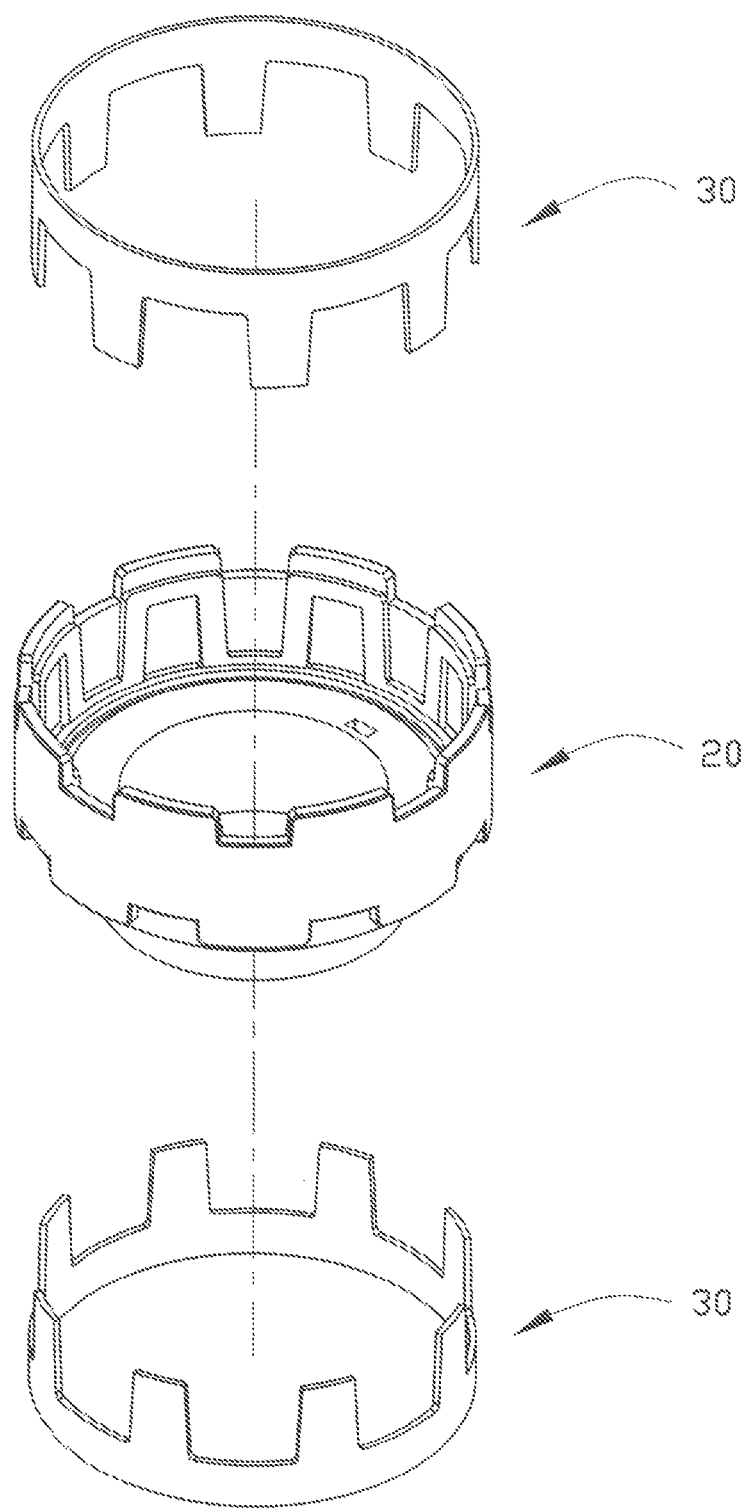
FIG. 2 is an exploded view of the present invention.

Referring to FIG. 2, a torsion sensor magnetic ring structure of the present invention includes a seat 20 and magnetic ring 30.

Figure 3:
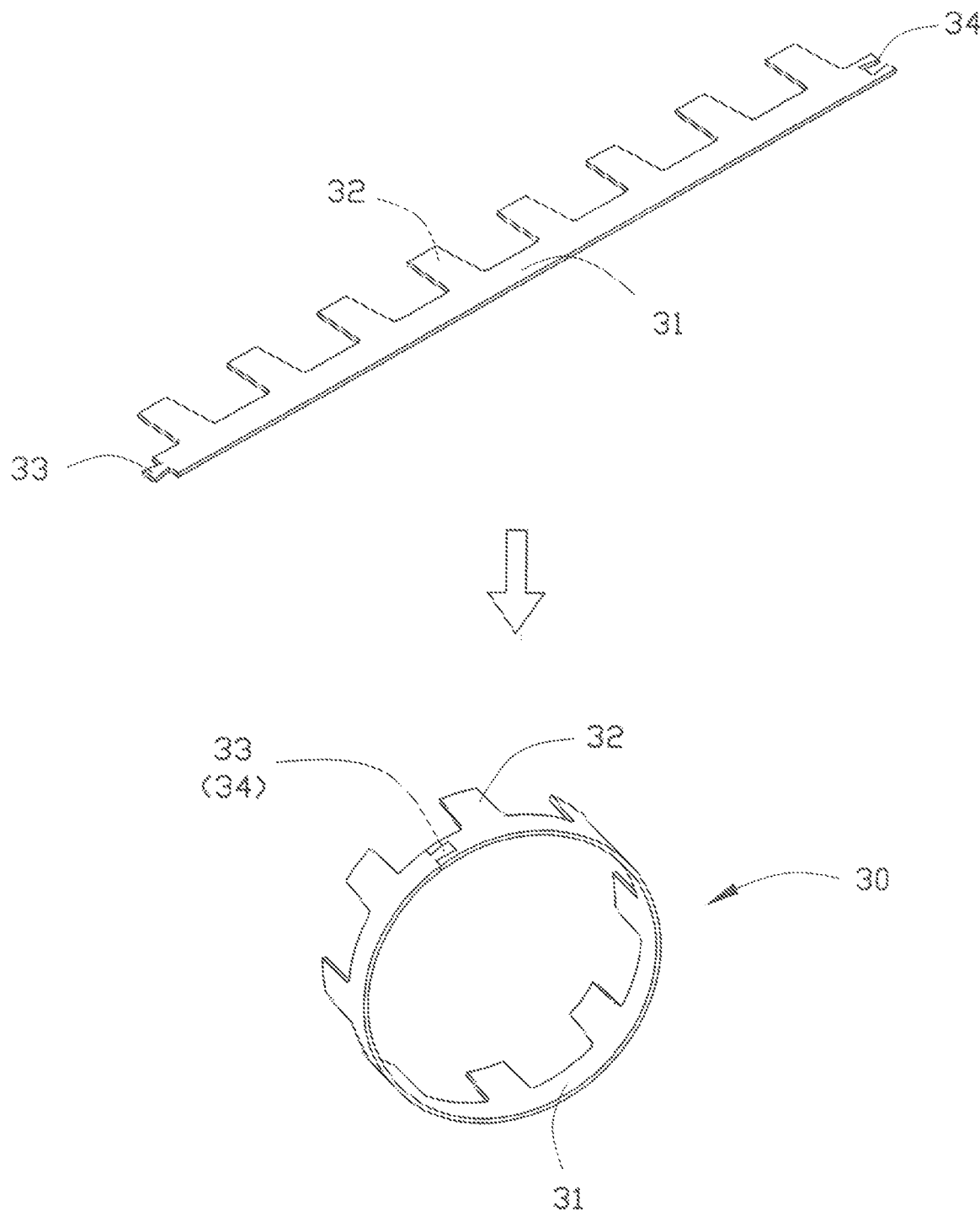
FIG. 3 is a schematically perspective view of a magnetic ring of the present invention, where a way how to form the magnetic ring is shown.

Referring to FIG. 3, the magnetic ring 30, in a preferred embodiment, is formed by punching a metal plate; a plurality of magnetic teeth 32 integrally spaced apart are formed on the long side of the substrate 31, and one narrow end of the substrate 31 is formed with an engagement tenon 33 and another narrow end thereof an engagement mortise 34, and the above plate is wound to form the magnetic ring 30, which is formed into a circular ring by inserting the engagement tenon 33 into the engagement mortise 34. According to the embodiment, the magnetic ring 30 of the present invention is simpler than conventional magnetic rings, and can save the material cost and reduce the volume and space.

Figure 4:
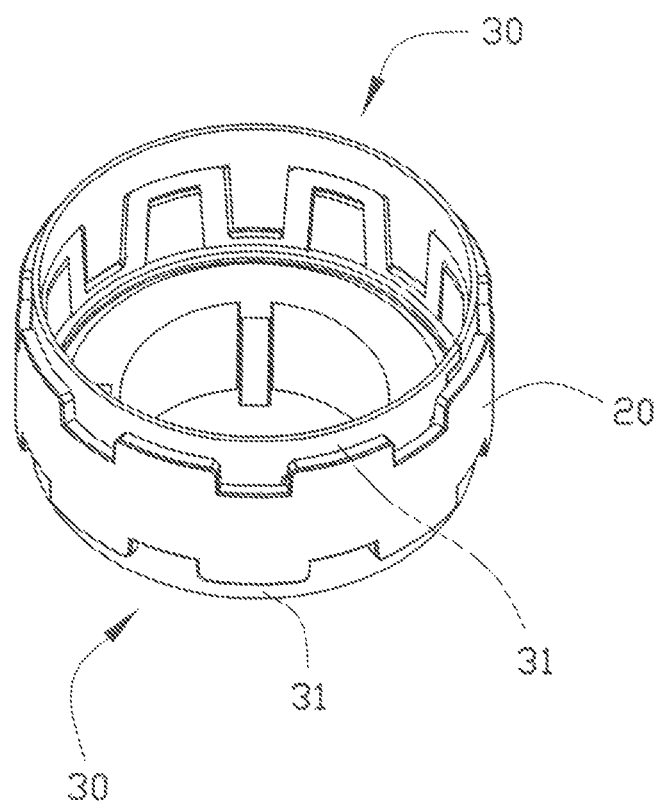
FIG. 4 is a perspective view of the present invention after the combination of the magnetic ring and a seat is combined together.

Referring to FIG. 4, the substrate 31 of the magnetic ring 30 is partially exposed when the magnetic ring 30 is in combination with the seat 20, thereby serving magnetic sensing well.

I claim:

1. A torsion sensor magnetic ring structure, comprising a seat and magnetic ring, wherein said magnetic ring is formed by punching a metal plate; a long side of a substrate is formed with a plurality of integral spaced magnetic teeth, one narrow end of said substrate is formed into an engagement tenon, and another narrow end thereof an engagement mortise, said substrate is wound and said tenon is in engagement with said engagement mortise to form into said circular magnetic ring, wherein the circular magnetic ring comprises a circumferential plate that extends in a circumferential direction and has two opposite edges spaced from each other in an axial direction, wherein one of the opposite edges that are spaced from each other in the axial direction defines the long side of the substrate and the plurality of magnetic teeth are formed to extend from the one of the opposite edges in the axial direction and are spaced from each other in a circumferential direction.

2. The structure according to claim 1, wherein said substrate of said magnetic ring is partially exposed when said magnetic ring is in combination with said seat.

* * * * *